3,465,032
PROCESS FOR REMOVING CARBONYL COMPOUNDS FROM VINYL ACETATE
Adolfo Aguilo, Gene J. Fisher, and Edward N. Wheeler, Corpus Christi, Tex., assignors to Celanese Corporation, New York, N.Y., a corporation of Delaware
Continuation-in-part of application Ser. No. 552,907, May 25, 1966. This application May 8, 1967, Ser. No. 642,278
Int. Cl. C07c 67/06
U.S. Cl. 260—499    15 Claims

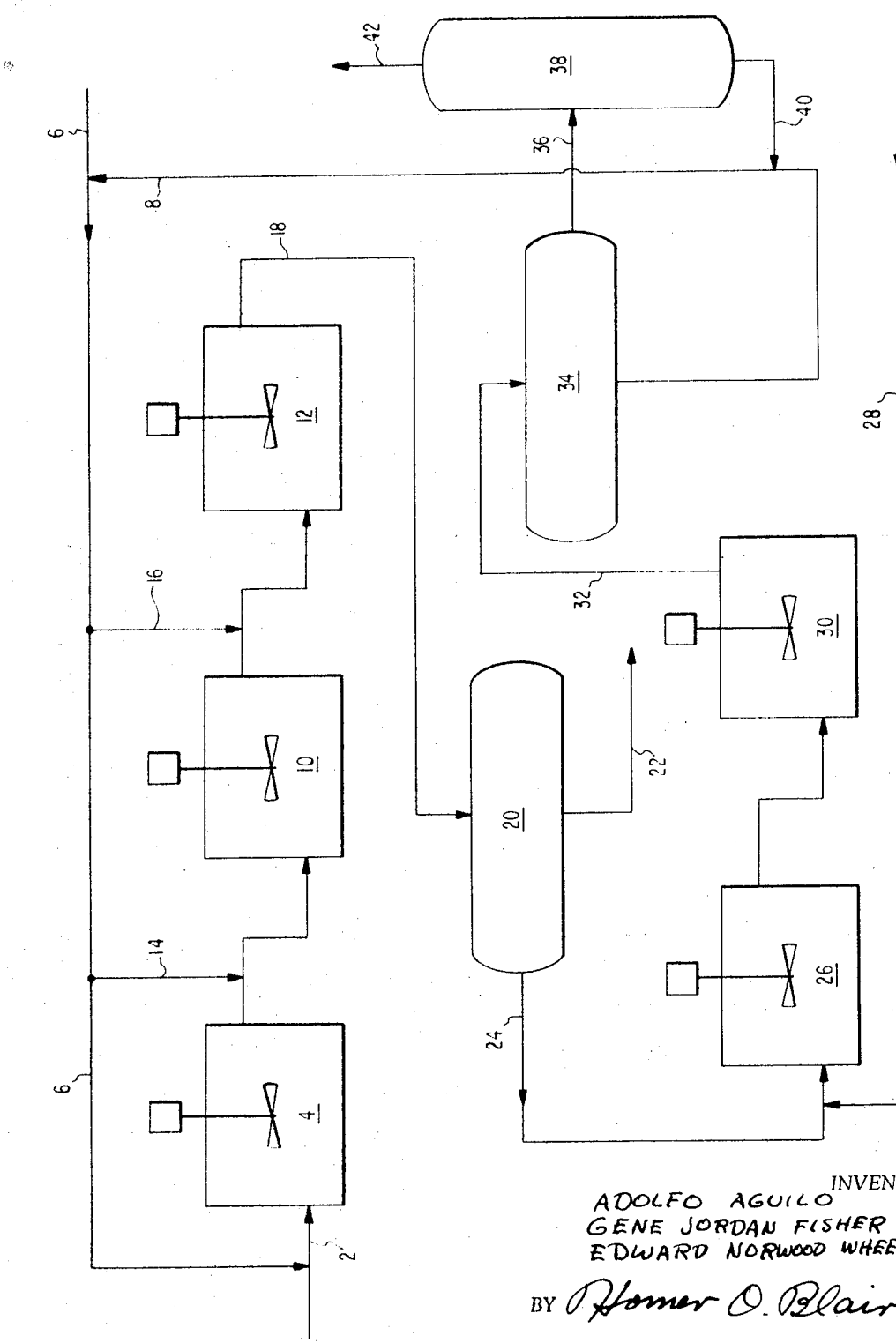

ABSTRACT OF THE DISCLOSURE

Vinyl acetate containing carbonyl impurities, such as is produced by reacting ethylene with acetic acid in the presence of a redox catalyst, is purified by intimately contacting it with an aqueous solution of a treating reagent comprising a sulfite or bisulfite, at a controlled pH and with a controlled molar ratio of treating reagent to carbonyl impurity, a treated vinyl acetate phase then being separated from a spent aqueous liquor containing bisulfite addition products of the carbonyl impurities.

---

This is a continuation-in-part of patent application Ser. No. 552,907, filed May 25, 1966, now abandoned.

The present invention relates to a process for the purification of crude vinyl acetate. Further, the invention relates to a process for the removal or separation of carbonyls, and particularly butyraldehyde, from vinyl acetate.

Heretofore, a principal method for producing vinyl acetate has been to react acetic acid with acetylene. Recently, however, ethylene-based processes have been developed, one of which comprises reacting ethylene with acetic acid in the presence of a reduction-oxidation catalyst system, commonly referred to as a "redox" catalytic system. In this redox system, an acid salt of a noble metal of Group VIII of the Periodic Table, for example, palladium chloride or palladium acetate, and a redox couple, such as cupric chloride or cupric acetate, are used. The palladium acid salt is reduced to palladium metal during the primary reaction step of combining ethylene with acetate to form vinyl acetate. Palladium metal is then reoxidized to the acid salt by reaction with the redox couple, such as cupric chloride, which is in turn reoxidized by reaction with oxygen. Such an ethylene-based vinyl acetate process is disclosed in U.S. patent application Ser. No. 389,477, filed Aug. 13, 1964, by Adolfo Aguilo, which is assigned to the Celanese Corporation.

The crude vinyl acetate which is produced by the above ethylene-based process contains small amounts of by-product organic compounds, particularly carbonyls such as formaldehyde, acetaldehyde, and butyraldehyde. Commercial specification vinyl acetate, to be suitable for use in other processes, e.g. if it is to be used as a monomer or comonomer for polymerization, must be substantially free of all impurities, particularly butyraldehyde, which causes severe odor problems in the finished vinyl acetate. Because of the similarity of boiling points of butyraldehyde and vinyl acetate, it is practically impossible to separate butyraldehyde from vinyl acetate by conventional distillation.

Accordingly, the primary object of the present invention is to provide a process for purifying crude vinyl acetate. Another object is to provide a process for removing or separating carbonyl compounds having from 1 to 4 carbon atoms from vinyl acetate. A further object is to provide a process for removing or separating carbonyl compounds such as formaldehyde, acetaldehyde, and particularly butyraldehyde from crude vinyl acetate obtained via an ethylene-based process.

In accordance with the present invention, a process is provided for the purification of crude vinyl acetate containing carbonyl compounds having from 1 to 4 carbon atoms. The crude vinyl acetate is contacted with an aqueous solution of a bisulfite such as sodium bisulfite, a sulfite such as sodium sulfite, or a mixture of the two at a mol ratio of bisulfite or sulfite to carbonyl compound of at least about 1:1, at a pH as defined hereinbelow, which is preferably in the range of from about 4.2 to 6.5, and for a period of time of at least about 5 seconds to 1 minute and preferably between 5 seconds and 1 minute, to extract at least a portion of the carbonyl compounds from the crude vinyl acetate, whereby a purified vinyl acetate phase having a lower content of carbonyl compounds than said crude vinyl acetate feed, and an aqueous phase are formed. The purified vinyl acetate phase is subsequently separately recovered.

In a preferred embodiment of the present invention, crude vinyl acetate obtained from an ethylene-based process and containing in the range of from about 100 to 3500 parts per million (p.p.m.) carbonyl compounds, based on vinyl acetate, is purified to remove substantially all of the carbonyl compounds therefrom, i.e., to below about 10 p.p.m. to 100 p.p.m. total carbonyl compounds, based on vinyl acetate. This preferred purification is accomplished by using a sodium bisulfite to carbonyl mol ratio in the range of from about 1.7:1 to 2:1, and maintaining the pH preferably in the range of from about 4.2 to 6.5 and most preferably in the range of 4.5 to 5.0.

The reaction of bisulfites with carbonyl compounds is a well known analytical procedure, and proceeds in the case of sodium bisulfite, according to the following reaction A:

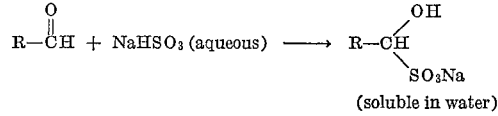

(soluble in water)

Heretofore, however, the reaction has been carried out with a large excess of bisulfite, normally 5 to 10 mols of bisulfite per mol of carbonyl compound, and employing reaction times of from about 2 to 5 minutes.

Such conditions are not practical nor economical for the separation of carbonyl compounds from vinyl acetate because under such conditions vinyl acetate reacts with the bisulfite according to the following reaction B:

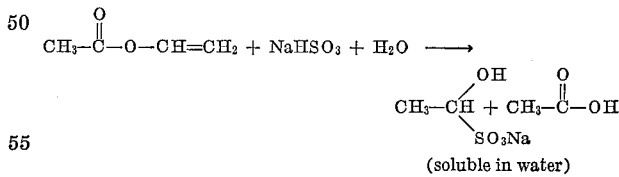

(soluble in water)

to form acetic acid and the sodium bisulfite addition product of acetaldehyde. An economically prohibitive amount of the desired vinyl acetate product is lost by the reaction, and the sodium bisulfite requirements are substantially increased. In addition, at reaction times of 2 to 5 minutes a substantial amount of the vinyl acetate is hydrolyzed to yield acetic acid and acetaldehyde according to the following reaction C:

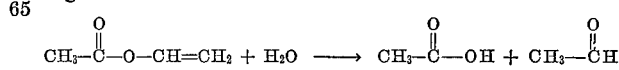

The formation of the additional acetaldehyde by reaction C correspondingly increases the sodium bisulfite requirements. Still further, at the reaction time of 2 to 5 minutes, the soluble salt which is formed by the reaction of butyraldehyde with the sodium bisulfite according to the following reaction D:

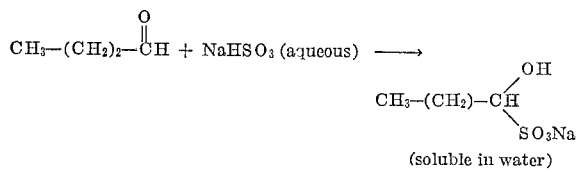

reacts with acetaldehyde to produce additional butyraldehyde according to the following reaction E:

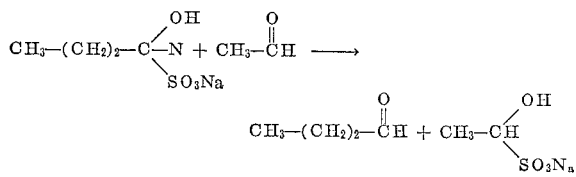

It has now been unexpectedly found that the above disadvantages can be overcome, and the bisulfite:carbonyl reaction can be employed to purify vinyl acetate, if the treatment ratio, defined as the mol ratio of sodium bisulfite to carbonyl compounds, is maintained in a low range, e.g. about 1:1 to 2.5:1, and further, if, during the treatment, the pH is maintained in a controlled range, i.e. above about 4.2 and below about 8.5. Under these conditions the reaction of the sodium bisulfite with the carbonyl compounds such as the above reactions A and D proceeds to completion before the above reactions B, C, and E essentially begin or at least before they proceed to any significant degree.

As is indicated above, the pH during the treatment, i.e. the pH of the aqueous phase containing the treating reagent such as bisulfite, is an important process parameter and must be controlled within certain limits for maximum effectiveness of the process of the invention. As employed herein, the term "reacting pH" is defined as the pH of the reacting aqueous solution of treating reagent in contact with the vinyl acetate being treated. The "equilibrium" pH, or pH of the spent aqueous phase, is the pH of the same aqueous phase at the conclusion of the treatment, immediately prior to being withdrawn from any further contact with the vinyl acetate. Thus, the reacting pH will normally be higher than the equilibrium pH. In practicing the invention it is recommended that the equilibrium pH be maintained in the range of approximately 3.1 to 8.5, preferably 4.2 to 7.5, and more preferably 4.2 to 6.5. Optimum results are obtained between about 4.5 and 5.0. At an equilibrium pH below about 4.2, reactions A and D above proceed more slowly than at pH 4.2 and above, while at equilibrium pH's above about 6.5, the equilibrium of reaction D begins to shift in such a direction as to yield free butyraldehyde while at the same time the amount of vinyl acetate lost by hydrolysis according to reaction C is greater than at pH's of about 6.5 or below. To practice the invention at equilibrium pH's below about 4.2, additional reaction time should be allowed and the treatment ratio should be increased. Specifically, at an equilibrium pH of about 3.1, the treatment ratio should be about 3:1 or 4:1. To practice the invention at an equilibrium pH above about 6.5, the contact time of treating reagent with vinyl acetate should be maintained at the lower end of the range of treatment times discussed hereinbelow, and the treatment ratio should also be increased. Specifically, at an equilibrium pH of 8.5, the treatment ratio should be in the range of 3:1 to 4:1 just as in the case of equilibrium pH's in the range of 3.1.

As discussed above, the equilibrium pH is to be distinguished from the reacting pH, that is the pH obtaining in the contacting zone or zones during the course of the treatment but before completion of the treatment. There is, however, an approximate relation between the two pH's. For example, an equilibrium pH of 4.2 to 6.5 typically corresponds to a reacting pH of approximately 5 to 7 in the bisulfite in the initial stages of reaction with the vinyl acetate phase, e.g. the pH of the aqueous effluent from the first stage of a two-stage contacting system will typically be 5 to 7. Likewise, when, as described below, the vinyl acetate leaving the reaction system after having been contacted with the bisulfite is washed with fresh buffering agent (e.g. sodium bicarbonate) which is subsequently to be mixed with the fresh bisulfite entering the reaction system, the pH of the aqueous sodium bicarbonate drawn off from the washing step and being forwarded to the step in which it is mixed with the bisulfite is typically approximately 6.5 to 7.5 when the final "equilibrium pH" is to be 4.2 to 6.5. The pH of the mixture of buffering agent and fresh bisulfite before the first contact with vinyl acetate is typically approximately 6.0 to 7.3.

It is recommended that, in addition to maintaining the equilibrium pH in the ranges discussed above, the reacting pH be maintained at a value not higher than 8.5, preferably not higher than 7.5. Otherwise product degradation can occur in the early stages of the reaction even though the equilibrium pH is not outside the recommended range.

The foregoing remarks have been presented in the context of a system in which a bisulfite, specifically sodium bisulfite, is being employed in conjunction with an alkaline buffering agent, specifically sodium bicarbonate. The invention may be practiced, however, with other reagents. Specifically, a sulfite may be used in place of a bisulfite or in admixture with a bisulfite. This is for the reason that, so long as the system is adjusted to a pH within the ranges discussed hereinabove, both sulfites and bisulfites form, in the aqueous solution, the reacting species which form bisulfite addition products with carbonyl compounds. If an alkaline sulfite is used in place of a bisulfite, however, the buffering agent employed to control the pH will be an acidic compound, such as a mineral acid or a carboxylic acid, rather than an alkaline compound such as sodium bicarbonate. Likewise, mixtures of sodium sulfite and sodium bisulfite can be chosen such that little if any added buffering agent is necessary at all. Sodium bisulfite, which is economically and advantageously procured in the form of sodium metabisulfite, is, however, the preferred treating reagent for two reasons. First, it is easily obtained and is inexpensive. Second, bisulfites require alkaline buffering agents, which can be advantageously employed to scrub acidic materials such as $SO_2$ out of the treated vinyl acetate prior to introduction of the buffering agent and bisulfite solution into the reaction system as will be described hereinbelow.

When an alkali sulfite, such as sodium sulfite, is employed as the sole source of the sulfur compound (sulfite or bisulfite), a problem may appear which is not characteristic of systems in which the treating reagent is bisulfite buffered with bicarbonate. Specifically, the reacting pH may be undesirably high. That is, even though the equilibrium pH may be within the desired range, the reacting pH occurring in the initial stages of the reaction may be so high, e.g. around pH 9, that undesired degradation reactions such as vinyl acetate hydrolysis will take place to a substantial extent. In such systems, as distinguished from those in which the treating reagent comprises predominantly sodium bisulfite, it is necessary to exert careful control over both the equilibrium pH and the reacting pH. This is done by employing acidic buffering agents as described above. It is recommended that the reacting pH be controlled at a value no higher than 8.5, and preferably not higher than 7.5.

To recapitulate, buffering or pH adjusting agents should be employed as necessary to control the equilibrium pH within the ranges described above and also to control the reacting pH at a level below 8.5 and preferably below 7.5. Above a reacting pH of 7.5 or an equilibrium pH of about 6.5, degradation reactions begin to take effect and greater quantities of treating chemicals are required for a given quantity of vinyl acetate feedstock.

The process of the invention is not restricted to the use of the sulfites and bisulfites of sodium as treating reagents. Any sulfite or bisulfite which is water-soluble and which forms water-soluble bisulfite addition products with carbonyl compounds can be employed with equal effectiveness, although the sodium compounds are preferred because of their ready availability and low cost. For example, the sulfites and bisulfites of lithium and potassium can be employed, as can be the corresponding ammonium compounds. The calcium and the magnesium compounds can also be employed, but their limited solubility makes them less useful than those mentioned above.

The buffering agent which is added to the aqueous treating liquid, either in the mixing zones to be described hereinbelow or else mixed with the treating reagent before introduction into the mixing zones, is chosen from alkaline or acidic materials accordingly as the bisulfite treating reagent being employed yields an acidic or alkaline system upon admixture with the vinyl acetate. As referred to herein, "buffering agent" does not necessarily mean a compound which is in itself a buffer but rather one which, after introduction into the reaction system, forms products which are buffers. For example, sodium hydroxide is a buffering agent in this sense, because within the reaction system it forms various sodium salts which are buffers. Suitable alkaline buffering agents are sodium bicarbonate, sodium sulfite, sodium carbonate, sodium hydroxide, and the like as well as mixtures thereof. Suitable acidic buffering agents are mineral acids and simple carboxylic acids such as acetic acid. As previously mentioned, the buffering agent is added in such quantity as to maintain the equilibrium pH preferably in the range of from about 4.2 to about 6.5, and most preferably from about 4.5 to 5.0, except when sodium carbonate is used as the buffering agent, in which case the equilibrium pH is preferably from about 4.5 to 6.0. The maximum reacting pH occurring in the system is kept below 8.5 and preferably not higher than 7.5.

The reaction time, that is the time during which the sulfite-containing aqueous phase is kept in extended interfacial contact with the vinyl acetate phase, is not critical, but a total contact time of at least five seconds is recommended for maximum utilization of treating chemicals and maximum removal of carbonyl impurities. Likewise, reaction times much over one minute are not normally necessary if efficient contacting devices are employed, and extended contact times can lead to product degradation through hydrolysis reactions and the like. It is recommended that efficient contacting devices be employed, with a contact time of at least five seconds to one minute and preferably between five seconds and one minute.

For a better and more complete understanding of the present invention, its objects, and advantages, reference should be had to the following description and to the accompanying drawing, which is a schematic flow diagram illustrating a process for removing carbonyl compounds having from 1 to 4 carbon atoms, particularly butyraldehyde, from crude vinyl acetate produced by an ethylene-based process.

Crude vinyl acetate produced via an ethylene-based process and usually containing in the range of from about 100 to 3500 p.p.m. carbonyl compounds, based on vinyl acetate, is introduced via a conduit 2 into contacting or mixing zone 4. While the amount of carbonyl compounds in the crude vinyl acetate feed to the mixing zone 4 is not critical, a typical crude vinyl acetate feed will contain in the range of from about 30 to 2000 p.p.m. acetaldehyde, 20 to 500 p.p.m. formaldehyde, and 20 to 500 p.p.m. butyraldehyde. Normally the butyraldehyde content runs in the range of from about 150 to 375 p.p.m., for example, about 300 p.p.m., but the invention is applicable generally to vinyl acetate feedstocks containing above about 20 p.p.m. butyraldehyde.

In addition to the above carbonyl impurities, ethylene-based vinyl acetate also contains water, acetic acid, formic acid, methyl acetate, and ethyl acetate as major by-product impurities. Preferably, the major portion of the water, acetic acid, and acetaldehyde are removed from the vinyl acetate by other purification means such as distillation (not shown in the drawing) prior to introducing the feed into the mixing zone 4. However, residual amounts of acetic acid, for example, about 1000 p.p.m. based on vinyl acetate, and acetaldehyde will still be present in the crude feed to the zone 4. The acetaldehyde will of course be removed by the present treatment. The methyl and ethyl acetates are normally removed, for example, by distillation treatments, subsequent to the removal of the butyraldehyde and other carbonyls.

An aqueous solution of treating reagent, e.g. sodium bisulfite, is introduced via conduits 6 and 2 into the mixing zone 4. While any concentration of treating reagent may be used, it is desirable that a near-saturated solution be used so that the feed ratio of vinyl acetate to water is as high as possible. Normally, a crude vinyl acetate feed to water ratio (volume ratio) in the range of from about 7:1 to 12:1, and preferably from about 9:1 to 10.5:1, for example, 10:1 is employed. However, higher or lower feed ratios may be used if desired. As previously mentioned, the treatment ratio is preferably in the range of from about 1:1 to 2.5:1, and most preferably 1.7:1 to 2:1. A buffering agent such as an aqueous solution of sodium bicarbonate is also introduced into the mixing zone 4, via conduits 8, 6 and 2, as hereinafter more fully discussed.

The materials are mixed in the mixing zone 4 so as to extract at least a portion, and preferably substantially all, of the carbonyl compounds from the crude vinyl acetate. The carbonyl compounds react with the treating reagent, sodium bisulfite in this case, to form the water soluble salts according to the aforementioned reactions A and D.

The crude vinyl acetate and sodium bisulfite may be contacted or mixed at any convenient temperature; normally, however, a temperature in the range of from about 15 to 75° C. is used, and preferably from about 30 to 50° C., for example 40° C. Desirably, the feed materials to the mixing zone 4 are preheated to the reaction temperature prior to being introduced thereinto. Normally, atmospheric pressures will be utilized in the mixing zone; however, higher or lower pressures may be used if desired.

The crude vinyl acetate and sodium bisulfite are mixed for a period of time in the range of from about 5 seconds to 1 minute, and preferably from about 18 seconds to 55 seconds. While the mixing or contacting of the materials may be accomplished in only one mixing zone 4, it is preferred that a series of stages of mixing zones be utilized with the total contact time still remaining within the aforementioned ranges. As illustrated in the drawing, it is preferred to use three mixing zones 4, 10 and 12, with the contact or mixing time in each zone preferably being about 18 seconds. If desired, a portion of the sodium bisulfite and buffering agent may be introduced into the mixing zones 10 and 12, conduits 14 and 16, respectively. Any conventional type of high-speed mixing device which will mix the materials in as short a time as possible may be utilized. Preferably the mixing zones are in-line blenders such as orifice mixers, rotary mixers, or even centrifugal pumps. Small vessels containing propeller-type agitators can also be employed.

Acid such as acetic acid and formic acid which is present in the crude vinyl acetate fed to the mixing zones is neutralized by a buffering agent according to the following typical reaction F in which sodium bicarbonate is employed:

The neutralization inhibits the formation of sulfur dioxide, which is formed by the reaction of sodium bisulfite with acetic acid according to the following reaction G:

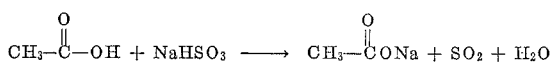

The formation of sulfur dioxide would create a corrosion problem in any subsequent purification equipment. However, any sulfur dioxide that is formed also reacts with the sodium bicarbonate according to the following reaction H:

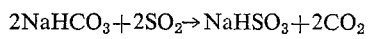

An effluent stream from the mixing zone 12 is withdrawn via a conduit 18, and introduced into any conventional type liquid settling zone such as a decanting zone 20, wherein a vinyl acetate phase having a lower carbonyl content than the crude vinyl acetate feed, and an aqueous phase containing the extracted carbonyl compounds are formed. The aqueous phase is withdrawn from the decanting zone 20 via a conduit 22 and usually discarded, while the purified vinyl acetate phase is recovered via a conduit 24.

The decanting zone may be maintained under any convenient conditions of temperature and pressure. Normally atmospheric pressure and a temperature in the range of from about 15 to 30° C. are used, for example 23° C. However, higher or lower temperatures and pressures may be used if desired. The purified vinyl acetate phase is normally separated from the aqueous phase during a period of time ranging from about 0.3 to 5 minutes, and preferably from about 0.5 to 2 minutes.

The purified vinyl acetate phase is conveyed via the conduit 24 into a mixing or contacting zone 26, wherein the purified vinyl acetate is contacted with an aqueous solution of sodium bicarbonate introduced via the conduits 28 and 24. If desired, the fresh buffering solution may be introduced with the sodium bisulfite into the mixing zones 4, 10, and 12, and the purified vinyl acetate withdrawn via the conduit 24 recovered as the final product. However, in most instances a small amount of sulfur dioxide is dissolved in the vinyl acetate phase; therefore, it is desirable to contact or wash the fresh sodium bicarbonate solution with the vinyl acetate phase in the zone 26 in order to remove any residual sulfur dioxide that might have been dissolved in the vinyl acetate phase according to the above reaction G.

The exact amount of buffering agent used depends on the amount of acid (normally formic acid and acetic acid) in the crude vinyl acetate feed to the mixing zone 4, and the amount of acetic acid and sulfur dioxide that are formed during the reaction in the mixing zones 4, 10, and 12. Normally in the range of from about 0.5 to 1.5 mols of sodium bicarbonate per mol of acid in the crude vinyl acetate feed, and preferably from about 0.75 to 1.25 mols of sodium bicarbonate per mol of acid are sufficient to remove any residual sulfur dioxide in the vinyl acetate phase and to maintain the pH within the aforementioned limits.

The conditions of temperature, pressure and residence time in the mixing zone 26 are conveniently the same as used in the mixing zones 4, 10, and 12.

While only one mixing zone 26 may be used to contact the purified vinyl acetate and buffering agent it is desirable to utilize a plurality of zones, and preferably two mixing zones such as zones 26 and 30 shown in the drawing. Generally, a residence time of about 15 to 30 seconds per zone is employed.

The mixing zones 26 and 30 may be of any conventional type, but are preferably the same as the aforementioned mixing zones 4, 10, and 12, i.e., an in-line blender or jet or orifice mixer.

Effluent is withdrawn from the mixing zone 30 via a conduit 32, and introduced into any conventional type liquid separation zone such as a decanting zone 34. A vinyl acetate phase substantially free of sulfur dioxide, and an aqueous solution of buffering agent such as sodium bicarbonate are formed therein. The aqueous solution of the sodium bicarbonate is withdrawn from the bottom of the decanting zone 34 via a conduit 8 and conveyed into the aforementioned mixing zones 4, 10, and 12 via the conduits 8, 6, and 2. Its pH is advantageously 6.5 to 7.5 when processing a typical feedstock to attain an "equilibrium pH" of 4.2 to 6.5. The purified vinyl acetate phase is withdrawn from the decanting zone 34 via a conduit 36.

The conditions maintained in the decanting zone 34 are preferably the same as the conditions maintained in the previously discussed decanting zone 30.

The purified vinyl acetate product withdrawn via the conduit 36 may be thereafter subjected to further purification, for example, to remove methyl and ethyl acetate. Preferably, however, the effluent is introduced into a water removal zone 38 such as a water coalescer column wherein any entrained water may be removed from the purified vinyl acetate phase. For example, the column 38 may be filled with glass wool or any other suitable inert packing on the surfaces of which droplets of water will coalesce so as to facilitate separation of the entrained water from the purified sulfur dioxide-free vinyl acetate phase. Other devices such as electrostatic emulsion breakers can be employed if desired in place of column 38. The separated water is withdrawn from the zone 38 via a conduit 40, and conveyed with the buffering solution via the conduit 8. The purified vinyl acetate product is withdrawn from the zone 38 via a conduit 42.

If desired, the purified vinyl acetate product withdrawn via the conduit 36 may be subjected to any conventional type water wash treatment (not shown on the drawing) prior to being introduced into the column 38. In this manner, any neutralized salts such as sodium acetate that are present in the entrained water will be removed.

As a result of the treatment with the sodium bisulfite, the carbonyl compound content of the crude vinyl acetate feed to the zone 4 is reduced, and preferably substantially all of the carbonyl compounds having from 1 to 4 carbon atoms are removed from the crude vinyl acetate feed. For example, the purified vinyl acetate product will normally contain less than about 100 p.p.m. carbonyl compounds, based on vinyl acetate. Typically, the purified vinyl acetate product will contain in the range of from about 3 to 30 p.p.m. butyraldehyde, 2 to 30 p.p.m. acetaldehyde, and 2 to 30 p.p.m. formaldehyde, based on vinyl acetate.

In addition, because of the novel conditions employed in the carbonyl-vinyl acetate contacting, less than about one weight percent of the vinyl acetate feed to the system is lost by hydrolysis, or reaction with sodium bisulfite, or dissolved in the aqueous phase.

The crude vinyl acetate, sodium bisulfite, and buffering agent may be mixed in any convenient manner, for example, cocurrently, countercurrently or batchwise, provided the conditions set forth above are followed. Countercurrent extraction is preferred when the crude vinyl acetate contains a larger amount of formaldehyde, since more than 80 weight percent of the formaldehyde is removed by water extraction. In this manner the sodium bisulfite consumption may be minimized.

It is to be understood that the present invention may be used for the removal or separation of any carbonyl compound having from 1 to 4 carbon atoms from vinyl acetate. Moreover, the amounts of such impurities may be higher or lower than the amount of the carbonyl compounds contained in the above-described ethylene-based vinyl acetate feed.

The present invention is additionally illustrated by the following examples.

EXAMPLE I

Several ethylene-based vinyl acetate feeds having a feed analysis as shown in Table I below were contacted with an aqueous solution of sodium bisulfite and sodium bicarbonate in a continuous cocurrent extraction system comprising three consecutive high-speed rotary in-line blenders. The vinyl acetate feed in all of the runs was preheated to 40° C., and the blenders were maintained at 40° C. and atmospheric pressure.

TABLE I

| Run Number | 1 | 2 | 3 | 4 |
|---|---|---|---|---|
| Vinyl Acetate Feed Comp., p.p.m.[1] | | | | |
| Based on Vinyl Acetate: | | | | |
| Butyraldehyde | 365 | 340 | 320 | 340 |
| Formaldehyde | 500 | 560 | 525 | 560 |
| Acetaldehyde | 1,040 | 1,110 | 1,070 | 1,110 |
| Bisulfite Feed Comp., mols/liter: | | | | |
| $NaHSO_3$ | 0.48 | 0.58 | 0.77 | 0.77 |
| $NaHCO_3$ | 0.14 | 0.14 | 0.14 | 0.14 |
| Phase Ratio (vol./vol.) Vinyl Acetate/ Aqueous Phase $NaHSO_3$ | 9.7 | 9.2 | 9.7 | 9.2 |
| Mols $NaHSO_3$/mol Carbonyl:[2] | | | | |
| Over-all | 1.23 | 1.56 | 1.96 | 2.05 |
| Added to First Blender | 0.82 | 1.56 | 0.93 | 2.05 |
| Added to Second Blender | 0.41 | None | 0.64 | None |
| Added to Third Blender | None | None | 0.39 | None |
| Residence Time in Each Blender, sec.[3] | 17 | 18 | 18 | 18 |
| Analyses of Vinyl Acetate (p.p.m.) in Each Blender at Steady State: | | | | |
| First Blender: | | | | |
| Butyraldehyde | 243 | 38 | 205 | 23 |
| Formaldehyde | 3 | 3 | 12 | 2 |
| Acetaldehyde | 190 | 16 | 121 | 13 |
| Second Blender: | | | | |
| Butyraldehyde | 53 | 13 | 39 | 12 |
| Formaldehyde | 1 | 2 | 6 | 2 |
| Acetaldehyde | 32 | 13 | 11 | 10 |
| Third Blender: | | | | |
| Butyraldehyde | 38 | 13 | 7 | 3 |
| Formaldehyde | 4 | 2 | 7 | 2 |
| Acetaldehyde | 15 | 12 | 8 | 7 |

[1] The vinyl acetate feed also contained 1,000 p.p.m. acetic acid and about 1% water, based on vinyl acetate.
[2] The ratio of bisulfite to carbonyl was calculated using the theoretical composition of the feed: 300 p.p.m. butyraldehyde, 500 p.p.m. formaldehyde, 1,000 p.p.m. acetaldehyde.
[3] Calculated with the total volume of each blender as 110 ml.

The pH of the spent aqueous phase was in the range of from about 4.2 to 6.5 in each of the above runs.

The above runs illustrate that at a mol ratio of sodium bisulfite to carbonyl of at least about 1:1, at a pH in the range of from about 4.2 to 6.5, substantially all of the carbonyl compounds will be removed from the vinyl acetate within a period of time of about 1 minute.

The following example illustrates operation over a range of pH conditions including some reacting pH conditions which are too high. It also illustrates the use of sodium sulfite in admixture with the bisulfite.

EXAMPLE II

Table II below summarizes the results of runs in which a crude vinyl acetate, of composition as listed, was treated countercurrently with treating solutions comprising various combinations of sodium bisulfite, sodium sulfite, and sodium bicarbonate as listed. Crude vinyl acetate was preheated to 40° C. and, at a rate of 332.5 ml. per minute, was pumped continuously into a first contacting stage which consisted of a high speed rotary blender in which the residence time was 18 seconds. Immediately prior to entry into the blender the vinyl acetate was commingled with the intermediate bisulfite treating liquid drawn off from the second contacting stage (to be described below). The partially treated vinyl acetate, mixed with the bisulfite treating liquid, then passed into a settling vessel having a residence time of 42 seconds for the organic phase and 2.8 minutes for the aqueous phase. From the lower portion of this vessel the spent bisulfite phase was drawn off and discarded after being analyzed. From the upper portion of this settling vessel the vinyl acetate, now partially treated, was continuously drawn off and commingled with the fresh bisulfite feed; the two commingled liquids then being passed into a second contacting stage consisting of two high speed rotary blenders each identical with the single blender which was used for the first contacting stage. The residence time in this second contacting stage was, therefore, 36 seconds. The vinyl acetate and bisulfite passed cocurrently through these two blenders, which were operated in series, and, upon being withdrawn from the second of these blenders were passed into a second decanting vessel substantially identical with that employed in the first contacting stage. From this second decanting vessel a purified vinyl acetate was drawn off and analyzed. Its composition in Table II below is listed as the "Second Stage VA Product." A bisulfite-containing aqueous phase was drawn off from the lower portion of the second settling vessel and pumped into the first contacting stage as described above. Its pH was measured, and is listed in Table II below as the "Intermediate Bisulfite pH."

To rephrase the above process description, vinyl acetate was treated countercurrently, in two contacting stages, with an aqueous liquid comprising a solution of sodium bisulfite, sodium sulfite, or a mixture of the two, in a system the first stage of which comprised a single rotary blender and the second stage of which comprised two rotary blenders operating in series. Each contacting stage was followed by a decantation vessel. The total length of each run was approximately 30 to 45 minutes.

TABLE II

Legend:
VA=vinyl acetate.
BuH=butryaldehyde.
AcH=acetaldehyde.
$CH_2O$=formaldehyde.
HCOOH=formic acid.
AcOOH=acetic acid.
Bisulfite feed=Solution of $NaHSO_3$ and/or $Na_2SO_3$ prior to contact with VA.
Intermediate bisulfite=Above feed after leaving second blending stage.
Spent sulfite=Above after leaving first blending stage.

| Run Number | 1 | 2 | 3 | 4 | 5 | 6 | 7 |
|---|---|---|---|---|---|---|---|
| VA Feed Composition: | | | | | | | |
| BuH, p.p.m | 335 | 335 | 335 | 335 | 335 | 335 | 335 |
| $CH_2O$, p.p.m | 475 | 390 | 390 | 390 | 475 | 390 | 675 |
| AcH, p.p.m | 1,145 | 1,170 | 1,170 | 1,170 | 1,145 | 1,170 | 1,200 |
| HCOOH, p.p.m | 1,000 | 1,000 | 1,000 | 1,000 | 1,000 | 1,000 | 1,000 |
| AcOOH, p.p.m | 1,000 | 1,000 | 1,000 | 1,000 | 1,000 | 1,000 | 1,000 |
| Bisulfite Feed Comp.: | | | | | | | |
| $NaHSO_2$, moles/l | 0.48 | 0.48 | 0.40 | 0.28 | 0.20 | 0.20 | 0.10 |
| $Na_2SO_3$, moles/l | | | 0.08 | 0.20 | 0.28 | 0.28 | 0.38 |
| $NaHCO_3$, moles/l | 0.42 | 0.78 | | | | | |
| Vol. VA/Vol. Bisulfite | 11.2 | 10.0 | 10.7 | 10.8 | 9.1 | 9.8 | 9.9 |
| Mols $(\cdot HSO_3 + \cdot SO_3)$/Mol $\overset{O}{\underset{\|}{C}}$ | 1.06 | 1.18 | 1.11 | 1.1 | 1.3 | 1.2 | 1.2 |
| First Stage VA Product: | | | | | | | |
| BuH, p.p.m | 205 | 500 | 290 | 335 | 338 | 230 | 180 |
| $CH_2O$, p.p.m | 2 | 5 | 30 | 5 | 44 | 58 | 7 |
| AcH, p.p.m | 94 | 1,010 | 260 | 320 | 1,390 | 80 | 80 |
| Second Stage VA Product: | | | | | | | |
| BuH, p.p.m | 5 | 255 | 34 | 6 | 330 | 1 | 2 |
| $CH_2O$, p.p.m | 2 | 3 | 15 | 18 | 2 | 10 | 7 |
| AcH, p.p.m | 7 | 46 | 25 | 13 | 1,010 | 18 | 15 |
| Bisulfite Feed pH | 7.3 | 7.3 | 5.8 | 6.5 | 9.3 | 6.7 | 7.1 |
| Int. Bisulfite pH | | 9.0 | 4.4 | 5.2 | 6.2 | 6.1 | 6.6 |
| Spent Bisulfite pH | 5.8 | 8.6 | 3.8 | 4.3 | 5.2 | 4.9 | 5.5 |

The data tabulated above indicate effective removal of carbonyl compounds from the crude vinyl acetate feed in all the runs tabulated with the exception of Run 2 and Run 5. Of these two runs, Run 5 exemplifies the unsatisfactory results of employing a bisulfite feed liquid the pH of which is higher than the recommended range (i.e. the pH is 9.3 as distinguished from a maximum recommended pH of 8.5 or preferably 7.5). Run 2 illustrates a condition in which, although the pH of the fresh bisulfite feed was within the recommended range (i.e. 7.3), the reacting pH (i.e. the intermediate bisulfite pH) was above the recommended upper limit (i.e. this pH was 9.0). This seemingly anomalous condition in which an intermediate reacting pH is higher than that of the bisulfite feed liquid can obtain in systems in which an unusually high ratio of bicarbonate to bisulfite is employed. To recapitulate in both Run 2 and Run 5 there are pH values outside the recommended ranges. In the case of Run 2 the equilibrium pH is outside the recommended range as well as one of the reacting pH's; in Run 5 the equilibrium pH is within the recommended range, but the bisulfite feed pH, which also approximates the reacting pH immediately after initial introduction into the vinyl acetate, is above the recommended range. In another run similar to Run 5, but not tabulated above, the bisulfite feed composition was 0.48 mole per liter of sodium sulfite with no sodium bisulfite. The bisulfite feed pH was 9.3, the intermediate bisulfite pH was 8.0, and the spent bisulfite pH was 5.5. The results of this run were very similar to those of Run 5.

The principle, preferred embodiment, and mode of operation of the present invention have been described in the foregoing specification. However, it should be understood that the invention which is intended to be protected herein may be practiced otherwise than as described without departing from the scope of the appended claims.

The embodiments of the invention in which an exclusive property or privilege is claimed are defined as follows:

1. A process for purifying crude vinyl acetate containing at least one carbonyl compound having from 1 to 4 carbon atoms, which process comprises:
   contacting said crude vinyl acetate, for a period of time of at least about 5 seconds, with an aqueous phase comprising an aqueous solution of a treating reagent comprising at least one sulfur compound selected from the group consisting of sulfites and bisulfites which are water soluble and which form water-soluble bisulfite addition products with said carbonyl compound;
   controlling the ratio of treating reagent to crude vinyl acetate at such a level that the treatment ratio of (bisulfite ions plus sulfite ions in the treating reagent) to (moles of carbonyl compounds in the crude vinyl acetate) is at least about 1:1, and
   controlling the pH of the aqueous solution of the treating reagent in contact with said crude vinyl acetate at a level not higher than about 8.5 during any stage of said contacting and at a level not lower than about 3.1 at the conclusion of said contacting;
   separating said aqueous phase from a non-aqueous phase comprising purified vinyl acetate having a carbonyl content lower than that of said crude vinyl acetate; and
   recovering said purified vinyl acetate.

2. The process of claim 1 wherein the carbonyl compound is at least one of the group consisting of formaldehyde, acetaldehyde, and butyraldehyde.

3. The process of claim 2 wherein the pH of said aqueous solution of said treating reagent is controlled by incorporating a buffering agent thereinto.

4. The process of claim 3 wherein the treating reagent comprises sodium bisulfite and the buffering agent comprises sodium bicarbonate.

5. The process of claim 3 wherein said treatment ratio is between about 1:1 and 1.5:1, the pH of said aqueous phase during said contacting is controlled at a value not higher than approximately 7.5, and the pH of said aqueous phase at the conclusion of said contacting is controlled between about 4.2 and 6.5.

6. A process for the purification of crude vinyl acetate obtained from an ethylene-based process and containing in the range of from about 100 to 3500 p.p.m. of carbonyl compounds, based on vinyl acetate, which process comprises:
   (a) introducing said crude vinyl acetate into a first mixing zone in contact with a near-saturated aqueous solution of sodium bisulfite at a mol ratio of sodium bisulfite to carbonyl compound in the range of from about 1:1 to 1.5:1, at a reacting pH not higher than about 8.5 and at a spent liquor pH in the range of from about 4.2 to 7.5, and for a period of time in the range of from about 5 seconds to 1 minute to yield a spent aqueous phase, and a vinyl acetate phase having a lower content of said carbonyl compounds than said crude vinyl acetate feed, said vinyl acetate phase also containing sulfur dioxide which is a by-product of the bisulfite-vinyl acetate reaction,
   (b) separately recovering the vinyl acetate phase,
   (c) introducing the vinyl acetate phase into a second mixing zone in contact with an aqueous solution of a buffering agent to remove the residual sulfur dioxide therefrom, and
   (d) thereafter separately recovering the sulfur dioxide-free vinyl acetate phase.

7. The process of claim 6 wherein the aqueous solution of the buffering agent is recovered from the second mixing zone and introduced into the first mixing zone to maintain the desired pH therein.

8. The process of claim 7 wherein the buffering agent comprises a near-saturated aqueous solution of sodium bicarbonate.

9. The process of claim 8 wherein the mol ratio of sodium bisulfite to carbonyl compounds is in the range of from about 1.7:1 to 2:1, the pH of the spent aqueous phase is maintained in the range of from about 4.5 to 5.0, and the first and second mixing zones are maintained at a temperature in the range of from about 15 to 75° C.

10. The process of claim 9 wherein the purified sulfur dioxide-free vinyl acetate phase contains in the range of from about 3 to 30 p.p.m. of butyraldehyde, 2 to 30 p.p.m. acetaldehyde, and 2 to 30 p.p.m. formaldehyde, based on vinyl acetate.

11. The process of claim 6 wherein the volumetric ratio of crude vinyl acetate to water introduced into the first mixing zone is in the range of from about 7:1 to 12:1.

12. The process of claim 6 wherein the butyraldehyde content in the crude vinyl acetate feed is above about 20 p.p.m. based on vinyl acetate.

13. The process of claim 6 wherein the first mixing zone comprises three separate stages, and the second mixing zone comprises two stages, the contacting time in each stage being about 18 seconds.

14. The process of claim 6 wherein the sulfur dioxide-free vinyl acetate phase is subsequently treated in a water coalescing zone to separate suspended water therefrom.

15. The process of claim 6 wherein the buffering agent comprises an aqueous solution of sodium carbonate, the pH of said spent aqueous phase is maintained in the range of from about 4.5 to 6.0, and the pH of the aqueous solution of the buffering agent after said solution has been brought into contact with said vinyl acetate phase in said second mixing zone is maintained at approximately 6.5 to 7.5.

References Cited

UNITED STATES PATENTS

| | | | |
|---|---|---|---|
| 2,431,554 | 11/1947 | Hansley et al. | 260—499 |
| 2,544,562 | 3/1951 | Michael | 260—586 |
| 2,555,553 | 6/1951 | Michael | 260—593 |

FOREIGN PATENTS 145,238  5/1962  U.S.S.R.

LORRAINE A. WEINBERGER, Primary Examiner

V. GARNER, Assistant Examiner

U.S. Cl. X.R.

260—497, 541, 542, 601, 604, 606